April 6, 1965　　　TATSURO KOMATSU　　　3,177,319
PLUG-TYPE AUTOMATIC TEMPERATURE CONTROL DEVICE FOR
ELECTRICALLY POWERED RICE COOKERS
Filed Feb. 14, 1962
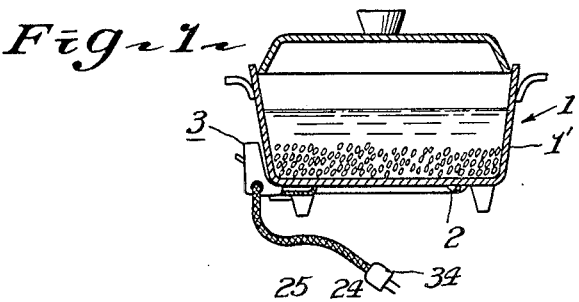
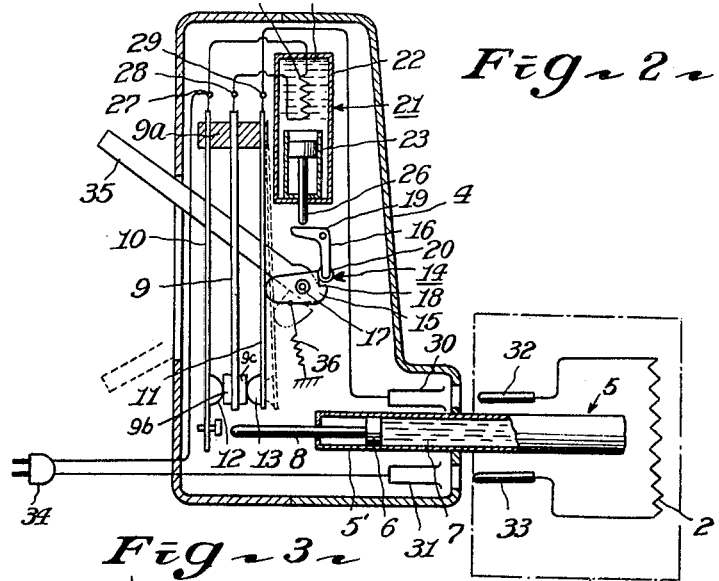
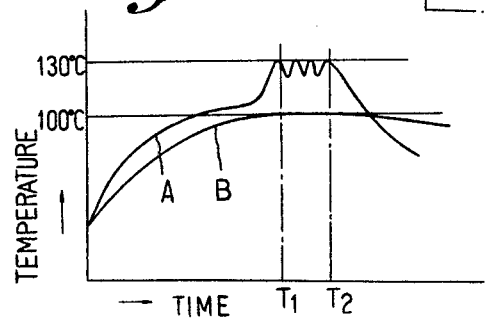

3,177,319
PLUG-TYPE AUTOMATIC TEMPERATURE CONTROL DEVICE FOR ELECTRICALLY POWERED RICE COOKERS
Tatsuro Komatsu, Suzukawa, Yoshiwara-shi, Japan, assignor to Tokyo Shibaura Denki Kabushiki Kaisha, Kawasaki-shi, Japan, a joint-stock company of Japan
Filed Feb. 14, 1962, Ser. No. 173,207
Claims priority, application Japan, Feb. 22, 1961, 36/5,719
1 Claim. (Cl. 200—136.5)

This invention relates generally to a plug type automatic temperature control device for rice cookers, more particularly for rice cookers of simple construction having small or substantially no heat storage capacity.

Known electric rice cookers are constructed with double or triple type kettle cookers so as to have substantial heat storage capacity and generally utilize a method of rice cooking comprising the steps of energizing an electric heater usually provided at the bottom of the cooker, deenergizing the electric heater when the water in the cooker is absorbed by the rice particles, and the temperature of the cooker rises abruptly and alphanizing, or converting the solid state starch contained in the rice particles to a gelatinized state and drying the cooked rice to a suitable point by utilizing the heat stored in the cooker itself. To this end, the bottom of the cooker where the electric heater is mounted is constructed to have a substantial mass or thickness, and the cooker is provided with a spaced outer jacket to define a heat insulating and storing chamber. As the result of this the construction of the rice cooker becomes more complicated and requires more material and labor to manufacture and hence the price of the cooker is high. Moreover, from the standpoint of heat economy the heat stored in the heat storage portion of the cooker becomes useless after alphanization has been completed. Therefore, it is advantageous to cook rice by utilizing a cheap and simple single wall electric pot or kettle with an electric heater directly mounted on its bottom because it is cheap and yet provides a high thermal efficiency. In order to prepare delicious boiled rice without forming a hard charred crust, however, it is necessary to utilize a process comprising the first step wherein water is caused to be absorbed by the rice particles by relatively strong initial heating and the second step wherein heat is decreased so as to thoroughly alphanize the rice particles without charring, while at the same time suitably drying the boiled rice by expelling surplus moisture. While numerous attempts have been made in the past to automatically carry out the above mentioned two steps, none of them have proved satisfactory. More particularly, a conventional thermostat or bi-metal thermostat mounted on the bottom of the pot will operate in the first step and will thus be unable to automatically control the second step, while a timer utilizing a clock mechanism and the like will not operate satisfactorily because the instant at which the electric heater should be deenergized must be varied depending upon the quantity of rice to be cooked. Moreover, such means are affected by the surrounding temperature so that in the one case, completely boiled rice will be obtained, while in the other case, the rice will be heavily charred.

A principal object of this invention is to provide a plug type automatic temperature control device for electrically powered rice cookers which can provide completely alphanized and suitably dried, delicious boiled rice without any charring by utilizing a cheap kettle of less heat storage capacity, for example a conventional single wall pot or kettle.

Briefly stated the plug type automatic temperature control device according to the invention comprises a temperature responsive device projecting from a casing thereof. Terminals are provided which are mounted in the control device casing and are adapted to be connected with the terminals of an electric heater provided for the kettle. Automatic reset type contacts are arranged within the control device casing so as to be operated by the temperature responsive device. The control device contains a thermal time delay device arranged within the casing thereof so as to be intermittently heated during opening and closing operation of the automatic reset contacts, and manual reset type contacts are arranged in the control device casing to be actuated by the time delay device.

The features of the invention which are believed to be novel are set forth with particularity in the appended claim. This invention, however, both as to organization and method of operation together with other objects and advantages thereof may be best understood by reference to the following description taken in conjunction with the accompanying drawing, in which:

FIG. 1 illustrates one example of a rice cooker utilizing a plug type automatic temperature control device constructed in accordance with the invention;

FIG. 2 is a schematic representation, in section, of an automatic temperature control device according to the invention; and FIG. 3 is a graph for showing the relation between heating time and temperature of a kettle and rice therein.

Referring now to FIG. 1 of the accompanying drawing, the rice cooker 1 comprises a simple single wall kettle or pot 1' of relatively small heat storage capacity, an electric heater 2, such as a sheath resistance heater suitably fixed to the bottom of the kettle by suitable means, for example, brazing, and a detachable plug type automatic temperature control device 3 according to this invention.

As shown in FIG. 2, the casing 4 of the control device contains therein operating mechanisms to be described in detail hereinafter and is supported by a suitable supporting frame, not shown. At the base portion of the casing there is mounted a temperature responsive device 5 extending out of the casing through the wall of the casing. The temperature responsive device comprises a tube 5' made of a material having a high heat conductivity such as copper or aluminum. A piston 6 is disposed slidable in the tube, and a heat resistant, expansible liquid 24, such as a silicon oil is contained in the tube and expands when heated to move the piston rod 8 out of the tube to actuate contacts 9c, 13 as more fully later described. When the control device is mounted on the rice cooker as shown in FIG. 1, the tube 5' is received in a socket at the bottom of the kettle. A pair of stationary contacts 9b, 9c are fixed to the opposite sides of a rigid contact bar 9 which has an upper end clamped between insulating blocks 9a. The contact bar 9 is disposed between spring 10 and a manual reset type contact spring 11, each carrying on a lower free end, a movable contact which cooperates with a corresponding fixed contact on the bar 9. The spring 10 provides automatic reset contact 12 and the spring 11 has a manual reset type contact 13. All of the contacts are arranged in series. Normally, the spring 10 is biased toward a contact closing position, while the spring 11 is biased toward a contact opening direction. In order to maintain the manual reset contact 13 in a closed position, a latch mechanism 14 is provided which may be of any suitable type but in one example illustrated comprises a latch cam 15 supported by a latch lever 16. The latch cam is pivoted at 17 and has a notch 18 at one end, while the other end is normally urged against the spring 11 by means of a tension spring 36 to maintain contacts 13 in closed condition with the stationary contact 9c on element 9. The L-shaped latch lever 16 is pivoted at 19 and has a roller 20 at its lower end. The roller is normally held in engagement with the notch 18 by a suitable spring not shown in the drawing, while the upper end of said lever 16 is made to face a piston rod 26 of a time delay device 21. The time delay device 21 includes a closed casing 22 which contains therein a piston-cylinder device 23, an expansible liquid 24, such as a silicon oil, adapted to actuate the piston, and an electric heater 25 of small rating for heating the expansible liquid. It is preferable to use a two or three watt carbon film resistor of 3 kiloohms as the electric heater. When the expansible liquid 24 is heated to a predetermined temperature by the electric heater 25, it expands enough to actuate the piston and its rod 26 for rotating the latch lever 16 in a counterclockwise direction as seen in FIGURE 2 to disengage the roller 20 from the notch 18, thus opening contact 13 and its associated stationary contact 9c. A pair of sockets 30 and 31 are arranged on both sides of the tube 5 to engage terminals 32 and 33 of the kettle heater 2. It should be understood that while these sockets are shown in the same vertical plane as the tube 5', in actual construction they are arranged in the same horizontal plane. The electric heater 25 of the time delay device is connected across terminals 27 and 28 of the spring 10 and contact bar, respectively. The terminal 27 is connected to one terminal of a source plug 34 and the terminal 29 of the spring 11 is connected to the socket 30, while the other socket 31 is connected to the other terminal of the source plug 34. An operating lever 35 is hinged on a pivot pin 17 to actuate the latch cam 15. It will be understood that the operating lever 35 and the latch cam 15 are mounted on the pin 17 in such a manner that they can rotate relatively by a small angle in order to permit manual release of the cam.

The operation of this invention is as follows:

After the plug type automatic temperature control device 3 has been attached to the kettle as shown in FIG. 1, the operating lever 35 is rotated to the position shown in FIG. 2 to lock the latch cam 15 by means of the latch lever 16. Then, the manual reset contact 13 is actuated to a closed position in contact with its respective stationary contact 9c. In this state, since the automatic reset contact 12 is in a position for a normally closed condition, an energizing circuit for the heater 2 is completed through contacts 12, 9b, 9c and 13, the sockets 30 and 31 and the terminals 32 and 33. In this condition, the electric heater 25 of the time delay device 21 is short-circuited by the automatic reset contacts 9b, 12 and hence is not energized. Rice and water in the kettle are boiled by the heater 2 and when nearly all of the water is absorbed by the rice particles, the temperature of the kettle, especially of its bottom, rises abruptly to about 130° C. at a time $T_1$ as shown by a curve A of FIG. 3. In response to this abrupt temperature rise, the oil 7 contained in the tube 5' expands to urge the piston rod 8 against the spring 10 to open the automatic reset contacts. Opening of these contacts causes series connection of the electric heater 25 of high resistance with the kettle heater 2, so that the latter heater does not generate any appreciable amount of heat, thus decreasing the temperature of the kettle. The kettle temperature decreases to a predetermined temperature between 130° C. and 100° C., the piston rod 8 retracts to reclose the automatic reset contacts. Whereupon, the kettle heater 2 is again energized and the heater 25 is short-circuited. The above described cycle of operation is repeated several times as shown by curve A. During this period, the temperature of the boiled rice is maintained substantially at 100° C. as indicated by curve B of FIG. 3 to effect alphanization and drying of the rice particles.

As a result of intermittent energization of the heater 25, during the open period of the movable contact 12 and its associated stationary contact 9b the oil 24 in the time delay device 21 is gradually heated and when the temperature of the oil reaches a predetermined value, the piston rod 26 releases the latch cam 15 through the latch lever 16 and the manual reset contacts 9c, 13 are opened as shown by the dotted lines, illustrating the spring 11 in a contact opening position thus interrupting the circuit of the kettle heater 2. Thus, the time delay device 21 initiates its timing action at time $T_1$ and trips the manual reset contacts at time $T_2$. As will be clear from the curve B of FIG. 3, since the temperature of the boiled rice is maintained at about 100° C., during the alphanizing and drying step, there is no possibility of forming charred crust.

When it is desired to deenergize the kettle heater at any time during rise cooking, the operating lever 35 is rotated in the counterclockwise direction to the position indicated by dotted lines. As mentioned above since the operating lever 35 can rotate a small angle with respect to the cam 15, the lower side edge of the operating lever will disengage the roller 20 from the notch 18 so as to trip the latch cam.

As will be seen from the foregoing description the present invention provides a compact plug type automatic temperature control device for rice cookers which can prepare perfectly alphanized and suitably dried delicious boiled rice without any charring by utilizing a cheap and simple single wall kettle having very little heat storage capacity.

While this invention has been explained by describing a particular embodiment thereof it will be appreciated that many modifications may be made. It is to be understood, therefore, that I intend by the appended claim to cover all such modifications, as fall within the true spirit and scope of the invention.

What is claimed is:

A plug-type automatic temperature contacts device for use in controlling rice cookers, said rice cookers including a kettle and a resistance heater for heating said kettle, said resistance heater having terminals for electrically connecting said control device to said resistance heater and for mounting said control device on said kettle, said control device comprising: a casing mountable in operation on said kettle; an electrical circuit mounted in said casing in positions electrically isolated therefrom for supplying electrical power to said resistance heater; a temperature-responsive device mounted on said casing in a position electrically isolated therefrom for sensing the temperature within said kettle, said temperature-sensing device being disposed extending into and outwardly of said casing and said kettle when said casing is mounted on said kettle; other terminals connected in said electrical circuit and mounted in said casing in positions electrically isolated therefrom for electrically connecting said control device with said terminals of said resistance heater, said casing being electrically isolated from said resistance heater when said casing is mounted on said kettle; automatic reset-type contacts mounted in said casing in positions electrically isolated therefrom, means in said temperature-responsive device for operating said automatic reset contacts automatically to a closed and an open position in dependence upon the temperature within said kettle; a thermal time-delay device mounted in said casing in a position electrically isolated therefrom; manual reset-type contacts mounted in said casing in positions electrically isolated therefrom and operated by said thermal time-delay device and connected in said electrical circuit in series with said automatic reset-type contacts; and latching means mounted in said casing in positions electrically isolated therefrom for normally holding closed said manual reset-type contacts, said thermal time-delay device including: a sealed casing; a body of expansible fluid contained in said sealed casing;

a high resistance heating element mounted in said sealed casing in a position electrically isolated therefrom for heating said expansible fluid, said heating element being normally short-circuited by said automatic reset-type contacts, and a piston mechanism actuated by said expansible fluid for actuating said latching means to a position for releasing said manual reset-type contacts whereby said expansible fluid is heated only when said automatic reset-type contacts are opened and said latching means is actuated by said piston mechanism when a predetermined amount of heat is stored in said sealed casing.

References Cited in the file of this patent

UNITED STATES PATENTS

| | | |
|---|---|---|
| 2,066,700 | Slough | Jan. 5, 1937 |
| 2,744,337 | Raney | May 8, 1956 |
| 2,902,567 | Weber et al. | Sept. 1, 1959 |
| 3,007,029 | Levine | Oct. 31, 1961 |